A. R. MEADORS.
ATTACHMENT OR SUPPLEMENTAL RIM.
APPLICATION FILED APR. 19, 1920.
1,365,840.
Patented Jan. 18, 1921.
2 SHEETS—SHEET 2.
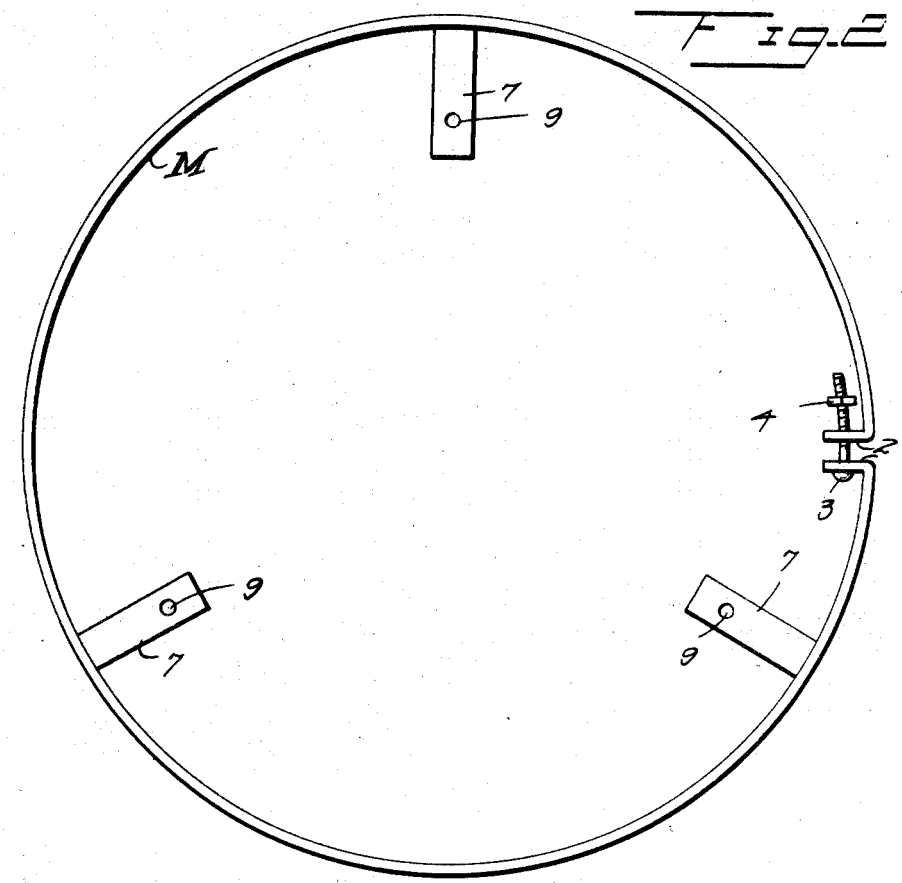
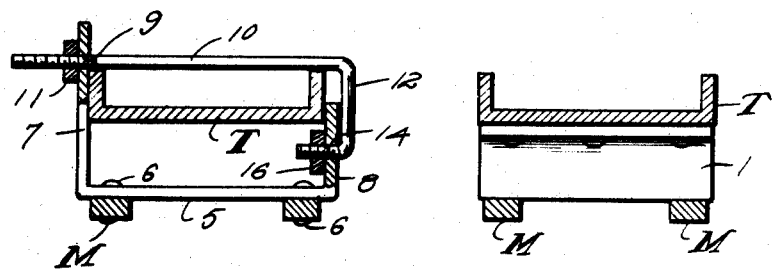
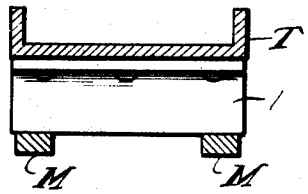
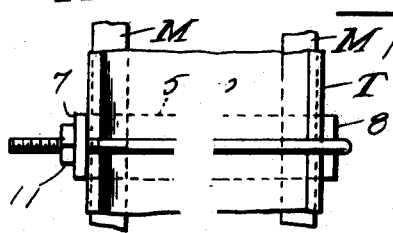
Inventor
A. R. Meadors
By Watson E. Coleman
Attorney

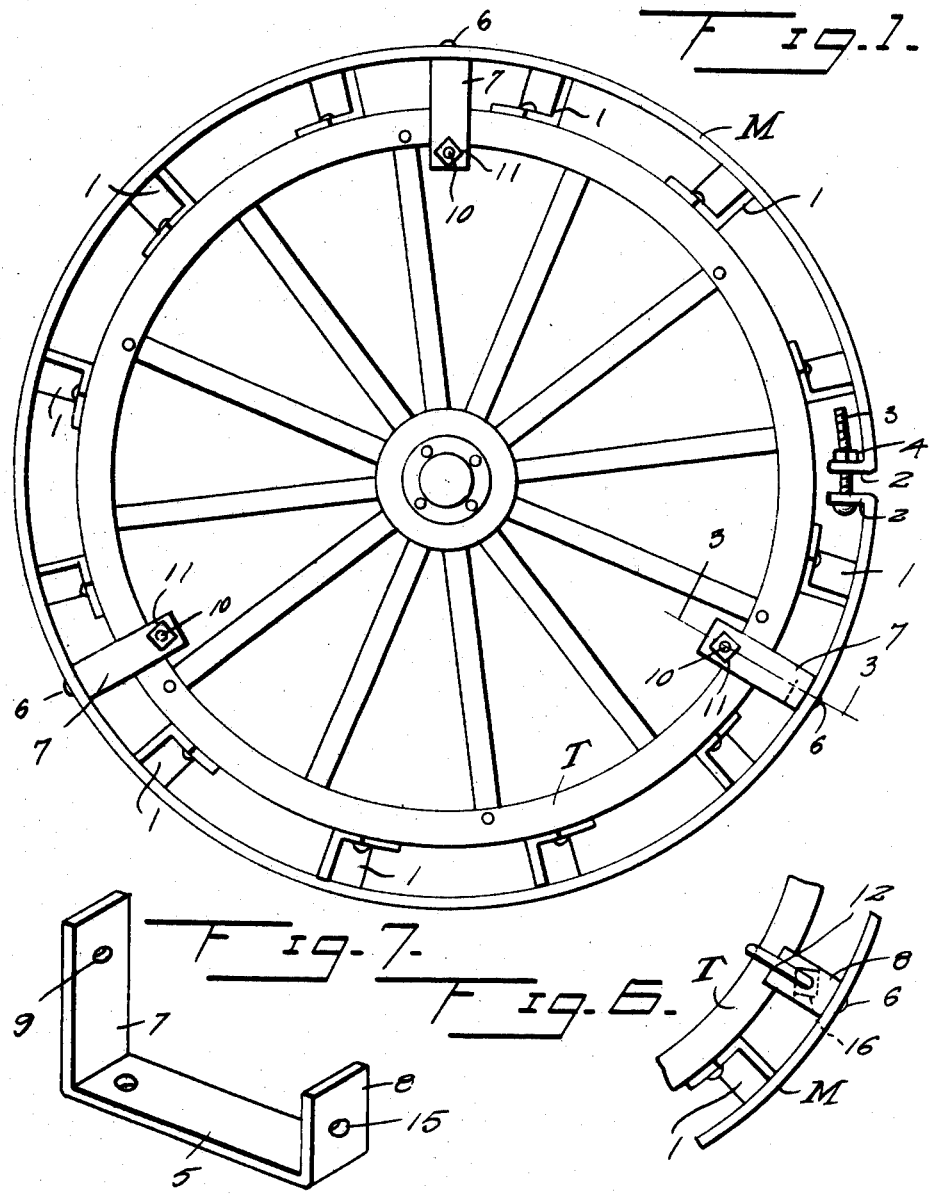

UNITED STATES PATENT OFFICE.

ANSEL R. MEADORS, OF FOUNTAIN INN, SOUTH CAROLINA.

ATTACHMENT OR SUPPLEMENTAL RIM.

1,365,840. Specification of Letters Patent. Patented Jan. 18, 1921.

Application filed April 19, 1920. Serial No. 375,057.

*To all whom it may concern:*

Be it known that I, ANSEL R. MEADORS, a citizen of the United States, residing at Fountain Inn, in the county of Greenville and State of South Carolina, have invented certain new and useful Improvements in Attachments or Supplemental Rims, of which the following is a specification, reference being had to the accompanying drawings.

This invention relates to wheel attachments, and it is primarily an object of the invention to provide a novel and improved attachment of this general character which constitutes a supplemental rim adapted to be quickly and effectively applied around the rim of a tractor wheel, said attachment, when applied, permitting the tractor wheel to travel over a roadway without injury thereto.

Another object of the invention is to provide a novel and improved attachment or supplemental rim for a tractor wheel which may be effectively tightened, when applied to the tractor wheel, by strain imposed thereon in a direction substantially circumferentially of the attachment or supplemental rim, together with means carried by the attachment or supplemental rim to anchor said attachment or supplemental rim in applied position.

Furthermore it is an object of the invention to provide a novel and improved attachment or rim of this general character comprising a plurality of split and substantially annular members arranged side by side and connected one to the other, and wherein the opposed end portions of each of the annular members have coacting therewith means whereby the same may be readily and conveniently contracted or expanded to tighten the attachment or supplemental rim in applied position upon a tractor wheel or to facilitate its removal.

A still further object of the invention is to provide a novel and improved device of this general character comprising two substantially annular members arranged side by side in predetermined spaced relation and connected at predetermined points by transversely disposed members, preferably three in number, and each of which members is provided with means to engage the tractor wheel whereby the device is effectively locked or held thereon.

The invention consists in the details of construction and in the combination and arrangement of the several parts of my improved attachment or supplemental rim whereby certain important advantages are attained and the device rendered simpler, less expensive and otherwise more convenient and advantageous for use, as will hereinafter be more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating an attachment or supplemental rim constructed in accordance with an embodiment of my invention and in applied position;

Fig. 2 is a view in side elevation of my improved rim detached;

Fig. 3 is an enlarged sectional view taken substantially on the line 3—3 of Fig. 1;

Fig. 4 is an enlarged transverse sectional view taken through the device as illustrated in Fig. 1 at a point between a pair of adjacent grousers or gripping flanges;

Fig. 5 is a fragmentary view in bottom plan of the structure particularly illustrated in Fig. 3;

Fig. 6 is a fragmentary view in side elevation of the assembled structure opposite to that shown in Fig. 1;

Fig. 7 is a view in perspective of one of the transverse straps or members herein employed.

As disclosed in the accompanying drawings, T denotes a tractor wheel of any ordinary or preferred type and which has extending outwardly from its periphery or tire the grousers or gripping flanges 1 of any desired type.

My improved attachment or supplemental rim comprises two split members M substantially annular in form and arranged side by side in predetermined spaced relation so that when the attachment or supplemental rim is applied to the traction wheel T, said members will extend around the opposite side portions of the rim or tire of the wheel.

Each of the members M is relatively broad and the free end portions thereof terminate in inwardly directed lugs or flanges 2 with which coact tightening means herein disclosed as comprising a headed bolt 3 loosely disposed through said lugs or flanges 2 and bridging the space therebetween and having operatively engaged with the free extremity of the shank a nut 4 or the like. By proper adjustment of the nut 4, the member M will be caused to contract or expand as required, and the contraction of the member is of particular advantage in causing said member M to tightly fit around the wheel T in contact with the grousers or traction lugs 1, while the expansion of said member permits the attachment or supplemental rim to be slipped off of the wheel T with ease.

Connecting the members M at predetermined points circumferentially thereof are the substantially equi-distantly spaced transverse straps or members 5 secured to the members M by the rivets 6 or the like. These straps or members 5 operate to maintain the members M in a fixed spaced relation and whereby the device or supplemental rim comprises a substantially unitary structure. In practice I find it of advantage to have the straps or members 5 three in number.

The opposite end portions of each of the straps or members 5 are provided with the inwardly disposed arms 7 and 8, with the arm 7 of a length greater than the arm 8.

The inner or free end portion of the long arm 7 is provided with an opening 9 through which is disposed an end portion of an elongated shank or bolt 10 having a nut 11 positioned outwardly of the arm 7. The opposite end portion of the shank or bolt 10 is provided with a laterally disposed extension 12 substantially perpendicular thereto, and which terminates in an inwardly directed extension 14 substantially in parallelism with the bolt or shank 10 proper. The extension 14 is directed through an opening 15 provided in the free end portion of the shorter arm 8 and threaded on the outer or free portion of said extension 14 is a clamping nut 16.

When my improved attachment or supplemental rim is in applied position, the members M are disposed circumferentially around the wheel T and are drawn tightly into contact with the grousers or lugs 1 by the coacting nuts 3 and bolts 4. The bolts or shanks 10 are then engaged with the inner face of the rim or tire of the wheel T whereby my improved attachment or supplemental rim is effectively held in applied position. In view of the simple construction of my improved attachment or supplemental rim as hereinbefore set forth, it will be readily seen that the same can be attached or detached with a minimum of work and skill, as there are no holes to bore and only the three bolts or shanks 10 to be removed or replaced.

From the foregoing description, it is thought to be obvious that an attachment or supplemental rim constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A supplemental rim for a tractor wheel comprising two split and substantially annular members arranged side by side, means connecting the free ends of each of the substantially annular members and operating to expand or contract said members, cross members connecting the substantially annular members and maintaining the same in applied position, each of said cross members having inwardly directed arms adjacent its opposite ends, and a transversely disposed member slidably engaged with one of the arms and detachably engaged with the second arm, said last named member being adapted to extend across the inner face of the tractor wheel when the supplemental rim is applied.

2. A supplemental rim for a tractor wheel comprising two split and substantially annular members arranged side by side, means connecting the free ends of each of the substantially annular members and operating to expand or contract said members, cross members connecting the substantially annular members and maintaining the same in applied position, the opposite end portions of each of the cross members being provided with inwardly disposed arms, one of said arms being shorter than the other, a transversely disposed member slidably disposed through the inner end portion of the longer arm, an end portion of said transversely disposed member being returned to provide an inwardly directed extension slidably disposed through the outer end portion of the shorter arm, and a holding member carried by the free extremity of said extension.

3. A supplemental rim for a tractor wheel adapted to be disposed circumferentially around the wheel, said rim at circumferentially spaced points being provided with a pair of transversely alined and inwardly disposed arms, one of said arms being longer than the other, an elongated member having one end portion slidably disposed through the free extremity of the longer arm and provided with a nut for contact with the outer face of said longer arm, the opposite end portion of the elongated member being returned to provide an inwardly disposed extension, said extension being slidably disposed through the free end portion of the shorter arm, and a holding member engaged with said extension and coacting with the inner face of the shorter arm.

In testimony whereof I hereunto affix my signature.

ANSEL R. MEADORS.